June 3, 1958 F. LAMPE ET AL 2,837,610

SWITCHING DEVICE

Filed July 20, 1955 2 Sheets-Sheet 1

INVENTORS
FRIEDRICH LAMPE
FRIEDRICH LAA
BY [signature]
AGENT

June 3, 1958 F. LAMPE ET AL 2,837,610

SWITCHING DEVICE

Filed July 20, 1955

2 Sheets-Sheet 2

INVENTORS
FRIEDRICH LAMPE
FRIEDRICH LAA
BY [signature]
AGENT

United States Patent Office 2,837,610

Patented June 3, 1958

2,837,610

SWITCHING DEVICE

Friedrich Lampe and Friedrich Laa, Vienna, Austria, assignors, by mesne assignments, to North American Philips Company, Inc., New York, N. Y., a corporation of Delaware Application July 20, 1955, Serial No. 523,248

Claims priority, application Austria September 10, 1954

6 Claims. (Cl. 200—18)

This invention relates to switching devices, more particularly intended for magnetic recorders and comprising switches, at least part of which is controlled by sliding rods.

The switches are of the kind in which the movement of the operating member is transferred to the switching mechanism proper by means of a rod which upon switching is displaced substantially in the direction of its longitudinal axis. Switches of this kind frequently comprise push buttons as operating members, the sliding rods usually being arranged in parallel. The movement may also be transferred by sliding rods, if the operating members have the form of rotary knobs.

It is frequently desirable to couple the possibility of operating an individual switch to the position of one or more of the other switches, in order to limit the switching possibilities. The sequence in which the switches can be operated must also preferably be determined. Such is the case, for example, in magnetic recorders in order to make possible only those positions of the switches which are of use for a determined operating position of the magnetic recorder. Thus, for example, a magnetic recorder has the following operating positions: the normal movement of the record medium for recording or a reproduction, rapid coiling forwards and backwards and, of course the stopping of all these movements.

It is known in magnetic recorders to limit the switching possibilities by means of partial locking. The present invention provides a solution for a magnetic recorder which by means of a switching device has the following properties: the operating positions "rapid forward coiling" and "rapid backward coiling" are each operated by a separate switch permitting the operating position to be switched on and off. The position of said two switches also determines whether reproduction or recording may be switched in. In order to switch over from recording to reproduction, the recording switch must first be brought into the O-position in order to be able to operate the reproduction switch. A similar procedure must be followed when switching over from reproduction to recording. The switches for reproduction or recording provide only the possibility of switching in this operating position. For effectively switching on or off it is necessary to operate another switch for the normal movement of the record medium. This switch permits the movement or the stopping of the record medium due to, for example, the pressure roller urging the record medium against the movement roller or moving it away therefrom. The switches for rapid forward and backward coiling are locked when the normal band movement is switched in, and conversely. Mutual locking of the two switches for rapid forward and backward coiling is desirable, though not absolutely necessary, since incorrect operation does not deteriorate a record on the record medium. The switches for recording and reproducion are so designed that a choice between recording and reproduction must be made before switching in the normal movement of the record medium. After the normal movement of the record medium has been switched in, it is not possible for recording or reproduction to be switched on or off. For this purpose the record medium must first be stopped, since the switch for the normal movement of the record medium locks the switches for recording and reproduction irrespective of their positions.

The present invention meets with the above-mentioned requirements with the use of a switching device comprising switches, at least part of which is controlled by sliding rods.

It is known to utilize switches with push buttons of a kind such that a pushed button is released by pushing other buttons. This has the disadvantage that in most cases two or more buttons may be pushed simultaneously. Locking of a button such that it cannot be pushed alone, but can be pushed only simultaneously with a second button, is also known.

However, these known switching devices are not suitable to meet with the requirement specified above.

According to the invention, in addition to a series of switches comprising relatively substantially parallel switching elements, for example, sliding rods, provision is made of another switch, of which the sliding rod extends transversely to the direction of movement of the switching elements of the series of switches, both the switching elements and the sliding rod having recesses, or only one of them having a recess or recesses, whereas the other is pivotally arranged, the switching elements and/or the sliding rod being adapted to move into said recesses. It is highly advantageous to provide the substantially parallel switching elements with push buttons, each of which may be maintained in the pushed position and released therefrom independently of the other buttons. The switching elements may advantageously be provided with locking members which become operative by tilting. The recesses and the pivotability may be such that either the switching elements of the series of switches and the sliding rod of the separate switch may lock one another, or the sliding rod of the separate switch may lock the switching elements of the series of switches in any position thereof. A highly advantageous device is obtained when the series of switches with parallel switching elements pairwise comprise a device permitting relative locking of the switching elements of one pair. The different functions in magnetic recorders are preferably divided over the switches of the switching device in such manner that the separate switch serves for the normal movement of the record medium whereas for the rapid forward and backward coiling or for electric recording and reproduction use is made of a pair of switches, the switches for the rapid coiling locking one another and locking the switch for the normal movement of the record medium and vice versa, and the switches for the electric recording and reproduction being locked by the switch for the normal movement, but not conversely.

In order that the invention may be readily carried into effect, it will now be described, by way of example, with reference to the accompanying drawings, wherein.

The normal movement of the record medium is controlled by a sliding rod operated by rotation; for the rapid coiling and for recording and reproduction provision is made of switching elements with push buttons, which switching elements comprise locking members which become operative by tilting.

Figure 1:
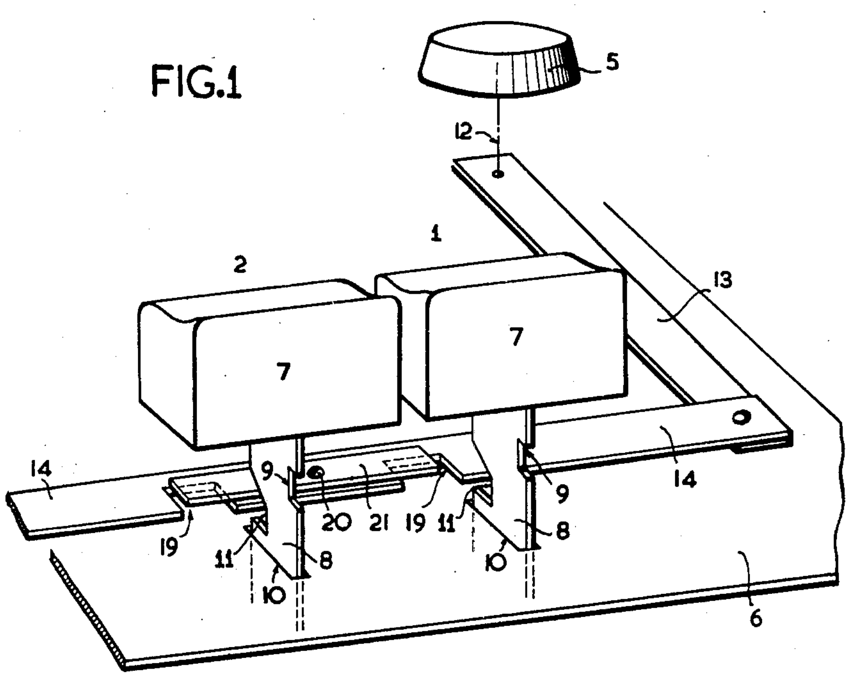
Fig. 1 is a schematic diagram of an embodiment of the device of the present invention.
Figure 1:
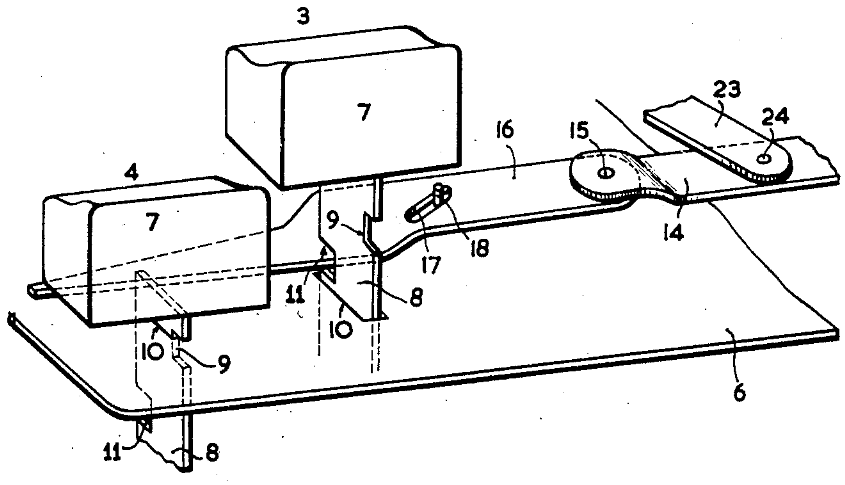

In Fig. 1, the chassis plate of a magnetic recorder carries the operating members and the switching elements transferring the movement to be switched. (The upper and lower parts of Fig. 1 are shown separately for drawing technical reasons, but must be regarded as associated parts of the same embodiment, the lower part of Fig. 1 having to be imagined as a continuation on the left-hand side of the upper part.) The switches themselves and the parts controlled by them are omitted for the sake of clarity. The drawing shows the operative position "recording with normal movement of the record medium."

Figure 2:
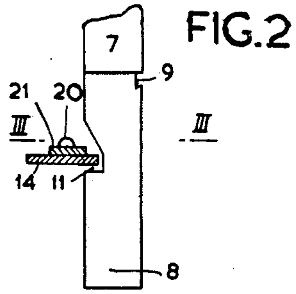
Fig. 2 is a view of a portion of the device of Fig. 1.
Figure 3:
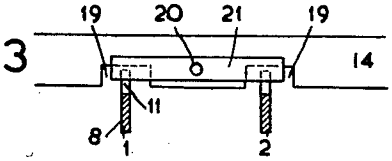
Fig. 3 is a view of the portion of Fig. 2, in a first operating position, taken along the line III—III of Fig. 2.
Figure 4:
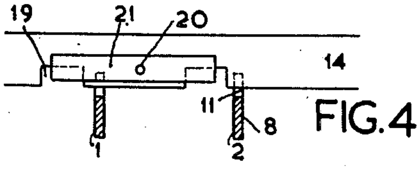
Fig. 4 is a view of the portion of Fig. 2, in a second operating position, taken along the line III—III of Fig. 2.
Figure 5:
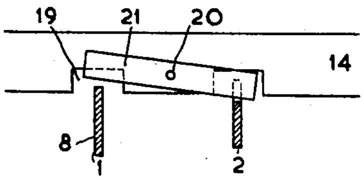
Fig. 5 is a view of the portion of Fig. 2, in a third operating position, taken along the line III—III of Fig. 2.
Figure 6:
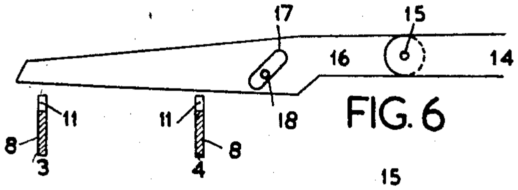
Fig. 6 is a view of another portion of the device of Fig. 1, in a first operating position.
Figure 7:
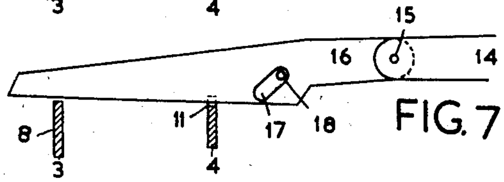
Fig. 7 is a view of the portion of Fig. 6, in a second operating position.

Fig. 1 shows a push button for rapid backward coiling, indicated by reference numeral 1, one for rapid forward coiling, indicated by reference numeral 2, the one for reproduction, indicated by reference numeral 3, and the one for recording, indicated by reference numeral 4. Reference numeral 5 is a knob of the switch for the normal movement of the record medium which by means of rotation about a shaft 12 can displace a sliding rod 14 in the direction of its length with the use of a lever 13. The whole of the switching device is mounted on a chassis plate 6. Sliding rods 8 comprising button bodies 7 may be displaced in the direction of their length and, after pushing, can also tilt, thus causing recesses 9 to be locked in an aperture 10 of the chassis plate 6. Each sliding rod 8 in addition has a recess 11. The recesses 11 in the case of the buttons 1 and 2 are bounded at their upper sides by bevelled edges. The sliding rod 14 may be shifted in the recesses 11 of the rods 8 (see Fig. 2). The sliding rod 14 also has recesses 19 in which the rods 8 can be shifted (see Fig. 3). When the sliding rod 14 is shifted (see Fig. 4), the two buttons 1 and 2 are locked. When in the position of the sliding rod 14 as shown in Fig. 1 one of the buttons (1, 2) is pushed (see Fig. 5), the sliding rod 14 is locked by one of the rods 8. In order to prevent the buttons 1 and 2 from being pushed simultaneously, the sliding rod 14 carries a lever 21 which can rotate about a shaft 20. When a button 1 or 2 is pushed, the bevelled edge of the recess 11 (Fig. 2) slides along the lever 21 and turns away one extremity thereof. As a result thereof, the other extremity of the lever 21 comes to lie in the recess 11 of the other button, thus locking the second button (Fig. 5). When the pushed button is released, the other button may readily be pushed, since the lever 21 is then movable again. In Figs. 3 to 5 and also in Figs. 6 to 9, which will be referred to hereinafter, the pushed button (1 in Fig. 5; 3 in Figs. 7 and 9) is continuously cross-hatched, as may be seen from Fig. 2, and shown a little farther away from the sliding rods 14 as compared with the non-pushed buttons, whereas the latter are not cross-hatched continuously (1, 2 in Figs. 3 and 4; 2 in Fig. 5; 3 and 4 in Figs. 6 and 8; 4 in Figs. 7 and 9). At the pushed position, the full section of the rod 8 is at the level of the sliding rod 14 and at the non-pushed position the cross-section of the recess 11 is at this level.

Figure 8:
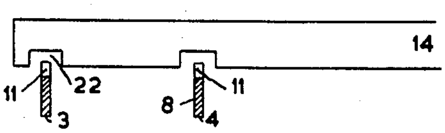
Fig. 8 is a modification of the portion of Fig. 6, in a first operating position.
Figure 9:
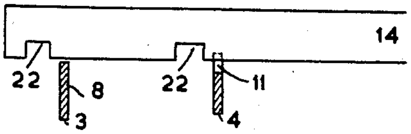
Fig. 9 is a view of the portion of Fig. 8, in a second operating position.

The sliding rod 14 also controls all members for the normal movement of the record medium, for example, the urging of the rubber pressure roller against the movement roller, this is shown below in Fig. 1 by a lever 23 having a pivot 24. The extremity of the sliding rod 14 is provided with a sliding rod 16 by means of a pivot 15 and extends along the rods 8 of the buttons 3 and 4. An inclined slot 17 of the lever 16 slides on to a pin 18 secured in the chassis plate 6 during the sliding movement of sliding rods 14. When for switching in the normal movement of the record medium the sliding rod 14 is moved in the buttons 3 and 4, the lever 16 is pushed against the rods 8 of the buttons 3 and 4, the lever 16 thus engaging in the recesses 11, when the buttons 3 and 4 are not pushed, and locking them. In order that one of the buttons 3, 4 may be pushed, the lever 14 must be pulled to the right for the normal movement of the record medium. In the pushed position of a button, the corresponding rod 8 is tilted, so that the sliding rod 14 is pushed unhindered to the left and the lever 16 is pushed against the rods 8. The pushed button is now also locked, since the lever 16 does not permit the tilting movement of the rod 8 which is necessary for the release (see Figs. 6 and 7). Figs. 8 and 9 show another possible construction in which the sliding rod 14 is utilized for locking the buttons 3 and 4. By means of the tilting movement of the rods 8 of the buttons 3 and 4, it may be ensured that the sliding rod 14 can slide along a tilted rod 8.

The buttons 3 and 4 may relatively be locked in a similar manner as the buttons 1 and 2.

The invention is not limited to the design in which the buttons 1 to 4 have slidable rods 8. Said switching elements may alternatively perform a rotational movement and in this case also a sliding rod placed transversely co-operates with a plurality of substantially parallel switching elements. Furthermore, the invention is important not only for magnetic recorders but in all those cases in which switching problems of the above-mentioned kind occur.

While the invention has been described by means of specific examples and in specific embodiments, we do not wish to be limited thereto, for obvious modifications will occur to those skilled in the art without departing from the spirit and scope of the invention.

What is claimed is:

1. A switching device comprising a plurality of substantially parallel switching elements, a plurality of interconnected slidable elements, a switch member operatively connected to said slidable elements for moving the latter in a direction substantially transverse to the direction of movement of said switching elements, each of said switching elements and one of said slidable elements being provided with recesses, another of said slidable elements being pivotally connected to said one of said slidable elements, the latter being selectively and removably engaged in at least one of said recesses of said switching elements, and the latter being selectively and removably engaged in at least one recess in said one slidable element.

2. A switching device as claimed in claim 1, further comprising a push button operatively connected to each of said switching elements whereby each of said push buttons may be maintained in a depressed position therefrom independently of the other push buttons.

3. A switching device as claimed in claim 1, wherein each of said switching elements is provided with locking means which becomes operative upon tilting of the respective switching element.

4. A switching device as claimed in claim 1, wherein said recesses are so arranged that said switching elements and said one of said sliding elements are adapted to selectively lock one another against movement.

5. A switching device as claimed in claim 1, wherein at least two of said slidable elements may lock each of said switching elements in any position of the latter.

6. A switching device as claimed in claim 1, further comprising means for preventing two adjacent switching elements from being moved simultaneously, said means including a pivoting lever having the ends thereof located over the recesses of said one slidable element whereby when one switching element is activated an end of the lever is pivoted to a position in one of the recesses of switching elements to thereby prevent movement of the adjacent switching element.

References Cited in the file of this patent

UNITED STATES PATENTS

| | | |
|---|---|---|
| 2,080,964 | Forstrom | May 18, 1937 |
| 2,451,150 | Brian | Oct. 12, 1948 |
| 2,558,113 | Walton | June 26, 1951 |
| 2,593,288 | Fisher | Apr. 15, 1952 |
| 2,647,964 | Merkel | Aug. 4, 1953 |
| 2,676,212 | William | Apr. 20, 1954 |